United States Patent Office 2,881,067
Patented Apr. 7, 1959

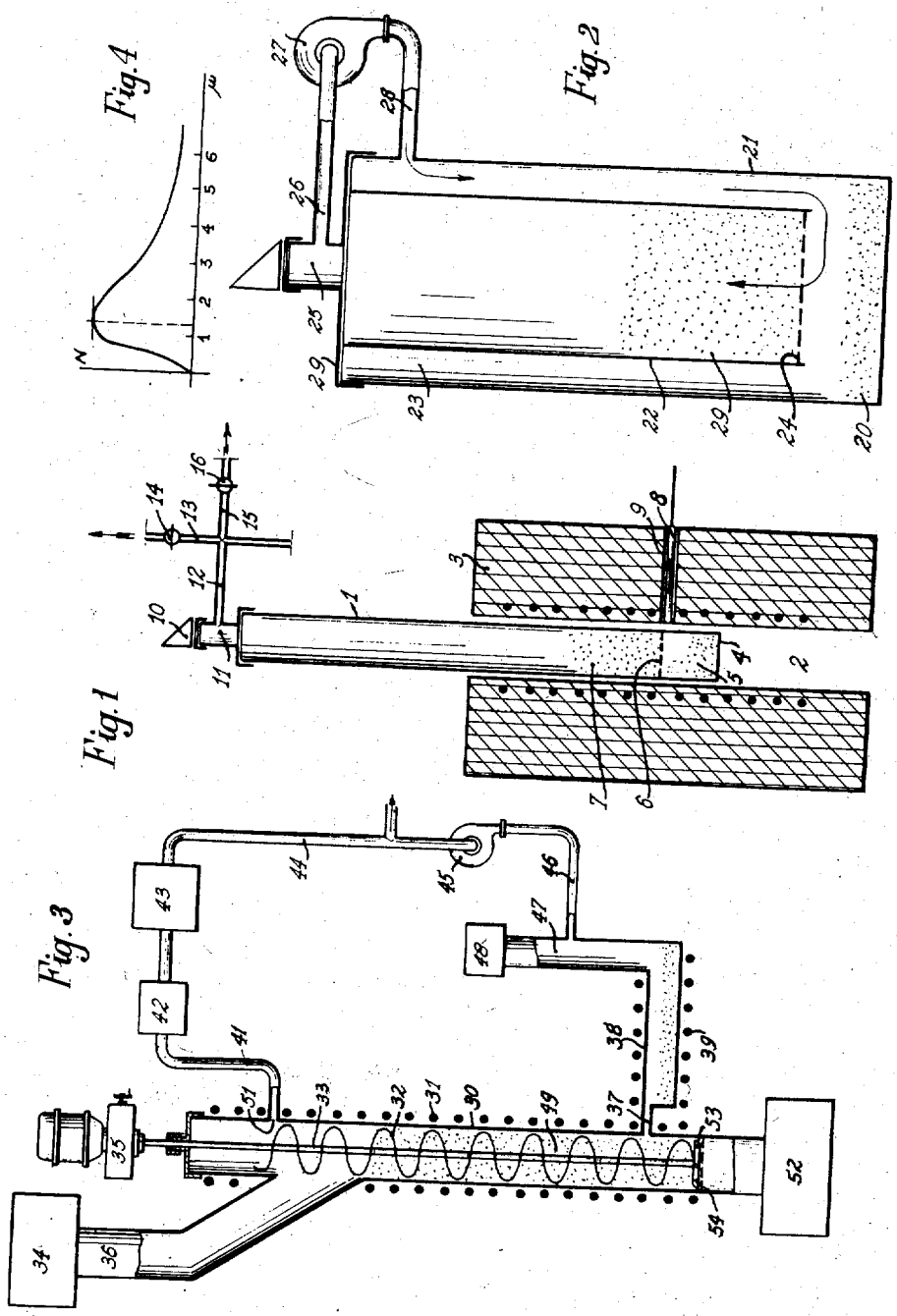

2,881,067
METHOD OF PRODUCING POWDER METALS

André Hivert, Pontoise, and Skon Tacvorian, Paris, France, assignors to Office National d'Etudes et de Recherches Aeronautiques, Chatillon-sous-Bagneux, France, a corporation of France Application February 27, 1956, Serial No. 568,054

Claims priority, application France February 28, 1955

6 Claims. (Cl. 75—0.5)

This invention relates to the production of chromium powder.

In the production of various kinds of sintered materials valuable in connection with sintering and powder-metallurgy processes widely used in present-day engineering, it is found imperative that predetermined particle sizes should be used with comparatively close tolerances for the starting materials if high-grade final products are to be obtained. This is especially true for the metalloceramical compositions sometimes known as "Cermets." Whereas the ceramic constituents in such compositions can be prepared with the desired high degrees of fineness without prohibitive difficulties being encountered, the same statement does not always hold for the metallic constituents therein. For example, considering the composition comprising particles of chromium, alumina, and possibly chromium oxide, bonded together by a sintering process, it is found that the performance characteristics of the final composition are largely dependent on the particle sizes of the constituents, and especially of the chromium metal constituent. Known grinding techniques as used in the manufacture of such powders set a definite limit to the degree of fineness attainable therefor, particularly as regards chromium. The present invention provides the possibility of directly producing a powdered metal, particularly powdered chromium, having a degree of fineness not heretofore achieved; such a highly powdered metal, when subsequently associated with further constituents such as alumina and chromium oxide, provides a sintered composition possessing greatly superior characteristics as compared to similar compositions wherein the chromium is initially provided in the conventional divided form heretofore used. Among the improved characteristics of such a novel composition, the increase in hardness, i.e. the erosion resistance of the sintered composition, is especially outstanding. Moreover, the breaking strength is also increased, by about 50%, and the resistance to thermal shock is similarly improved.

According to this invention, in the manufacture of powdered metals and particularly powdered chromium, there is used as an initial material a compound which inherently is of such nature that it may easily be obtained in a highly divided form, and such compound is subjected to a chemical reaction under conditions that may be controlled with sufficient accuracy to insure that the reaction will proceed in a temperature range and in a gaseous atmosphere such, that the chemical transformation will proceed without any substantial alteration in the structure of the powder particles, whereby the powdered metal will be obtained with a particle size identical or closely similar to that of the initial material. The initial compound may desirably be selected from among the group consisting of the oxides and halides of the metal, i.e. a chromium oxide or a chromium halide in the case having greatest practical importance. For displacing the oxygen or the halogen from the compound, the invention contemplates using a metal in gaseous form, since it is this form which allows most ready and accurate control of the conditions of reaction.

As the reagent metal, the invention primarily contemplates using magnesium and, in some cases, calcium. The applicants are aware that the use of magnesium in gaseous form has already been proposed for certain reactions, such as the manufacture of tantalum and other metal powders. However, it has not heretofore occurred to workers in the field to take advantage of the high flexibility of the action of a metal in the vapour phase upon a powdered derivative of chromium, in order to obtain this latter metal in the form of a powder having a degree of fineness generally believed to be unattainable.

It should be noted moreover that the reagent metal, magnesium or calcium, enters into the reaction in purely gaseous form, that is, in principle there is no participation in the reaction of magnesium or calcium in the liquid or the solid phases. However, the magnesium or calcium vapour used may originate from a solid or a liquid phase of said metals present within a common enclosure with the compound being treated, but in an area of said enclosure spaced from the area whereat said compound is disposed.

By varying the pressure and/or temperature in the enclosure, the reaction may be controlled with a very high degree of efficiency, whereby the desired fineness may be obtained for the final powder.

Where the metal vapour is thus produced in situ by evaporation, boiling or sublimation of the liquid or solid metal in the reactor, it becomes possible to regulate the rate of reaction to any desired value, as slow as may be desired, since the rate of formation of the metal vapour may be readily controlled by adjusting the temperature and/or pressure in the enclosure, having due regard for the structure of the mass of metal being evaporated (or vaporized or sublimated), and for the configuration of the enclosure. Thus, any fusing together or growth of the particles may be substantially prevented, so that the characteristics of the final metal will be identical or nearly identical with those of the initial powder compound.

Moreover, the reaction progresses smoothly and at a constant rate, since the metal vapour is taken up progressively as it is evolved, owing to its combining with the compound. The efficiency factor or yield of such a reaction will therefore be a maximum.

*Preparation of the chromium powder.*—The starting material used is a powder of chromium oxide or a powder of an anhydrous chromium halide, the fluoride being particularly desirable owing to its hydrophobic character, and the particle size of the powder used is selected to correspond with that of the desired chromium powder. The oxide or halide powder is placed in an enclosure which is evacuated and into which a protective (i.e. non oxidizing) gaseous atmosphere is then introduced. The enclosure further contains, out of contact with the oxide or halide, magnesium which may be used in the form of lumps or ingots as found in the trade, and may be unrefined. The enclosure is then brought to a temperature within a range from the melting point to the boiling point of magnesium. The magnesium then occurs in a gaseous phase and reacts with the chromium compound powder, e.g. the chromium oxide powder, in an irreversible reaction yielding chromium and magnesia. The analysis of the chromium thus obtained is substantially the same as that of the initial oxide or halide powder used. The magnesia is removed by any suitable method, e.g. treatment with an acid such as dilute nitric acid. Where the starting material was chromium halide, the magnesium halide formed is readily removed by a water washing step.

The rate of reaction and hence the temperature of the powder during the reduction process is controlled to the desired value, as mentioned hereinabove, by adjusting the temperature of the enclosure. An alternative means of adjustment is by acting on the pressure of the protecting gaseous atmosphere. By acting on this latter factor, it is possible to produce near-instantaneous variations in the reaction rate.

*Example I.*—Into a refractory steel tube 27 mm. in diameter, there are introduced:

50 grams magnesium in ingot form
100 grams $Cr_2O_3$ powder

The tube is evacuated and hydrogen is introduced into it. The enclosure is brought to a temperature of 900° C. For a hydrogen pressure of 76 cm. mercury, the reaction is completed in 55 minutes. The temperature of the powder during the reaction is about 950° C. When a 50 cm. Hg pressure is used, the reaction is completed in 7 minutes and the temperature of the powder rises to 1100° C.

If the gas pressure in the tube is 20 cm. mercury, the reaction is completed in about 3 minutes and the temperature therein rises to 1450° C.

The resulting powder is treated with dilute nitric acid, whereby the magnesia is removed. Then the product is washed with distilled water and dried.

There is obtained chromium powder having 99.5% purity and having a fineness approximately the same as that of the initial chromium oxide powder used, being the finer as the temperature of the powder was held down to a lower value.

Any impurities contained in the magnesium have no appreciable influence on the purity of the final metal since at the high reaction temperature the vapour tension of such impurities is low and their concentration is therefore negligible in the gas reacting with the powdered chromium derivative.

The invention also contemplates adding to the chromium compound powder, such as chromium oxide, an amount of neutral substance, e.g. magnesia, in order to dilute the reagent mixture and thereby reduce the reaction temperature.

In the ensuing description which is exemplary only, reference will be made to the accompanying drawings, wherein:

Fig. 1 is a diagrammatic view of apparatus for effecting the method of the invention;

Fig. 2 is similar to Fig. 1 but relates to another embodiment of the method;

Fig. 3 is a similar view for yet another embodiment; and

Fig. 4 is a diagram illustrating particle size control.

A steel tube 1 has its lower end immersed in an electric furnace 2 including a heating resistance 3. Disposed on the bottom 4 of tube 1 is an amount of magnesium in lump form, as shown at 3. Placed on a grate 6 extending transversely to the tube 1 and within the tube is a body of chromium oxide powder $Cr_2O_3$ as shown at 7. A thermocouple 8 is inserted into the furnace through a duct 9 formed therein substantially on a level with the grate 6. A total-reflection prism 10 is arranged at the top 11 of tube 1 for pyrometric readings. The tube 1 may selectively be connected through a conduit 12 either with a hydrogen pressure-reducer valve (not shown) connected with conduit 13 through valve 14, or with a vacuum pump (not shown) connected with conduit 15 through valve 16. Finally a further conduit 17 may connect the conduit 12 with a vacuum gauge.

In a modification of the method, heating means are applied, adapted to heat the chromium compounds to one temperature and the magnesium to another and different temperature, with the magnesium being arranged to remain at all times at a temperature somewhat less than that of the reagent charge during the reaction.

In a further embodiment, the reaction vapours may be discharged by entrainment with the protective gas and may be generated outside the reactor enclosure. Apparatus for performing this modified method is illustrated in Fig. 2. The magnesium or magnesium alloy is disposed on the bottom wall 20 of tube 21. Disposed coaxially in tube 21 is a further tube 22 defining an annular space 23 with the first tube and having a grate 24 across the lower end thereof, with the chromium oxide or chromium halide powder disposed on the grate. The parts of tubes 21 and 22 containing the magnesium and the chromium compound are placed in a furnace which may be similar to that shown in Fig. 1. Above the tube 22 is an axial sighting chamber 25 from one side of which a conduit 26 extends. This conduit leads to a gas-circulating means such as a suction and blower fan 27 having its discharge line connected with a union 28 in the top of the outer tube 21. Over the top of the tube assembly is a cover 29 having the chamber 25 formed in it.

The entire assembly is arranged for circulating protective gas by means of the fan 27 and said gas is moreover used for conveying the reagent metal vapour. The gas discharged through inlet 28 enters the top of annular space 23, flows downward therethrough, picks up magnesium vapour as it passes in contact with the reagent mass on the bottom wall 20, and thus loaded flows through the chromium compound powder, whereby the magnesium in the vapour phase reacts with the compound. The gas returns to the inlet of fan 27 by line 26. The rate of flow of the gas in the annular interval 23 is so predetermined as to prevent diffusion of magnesium vapour towards the cooler portions of the apparatus where it would otherwise tend to condense.

Reference will now be made to Fig. 3 which diagrammatically illustrates apparatus adapted for continuous reduction of powder oxides with metallic vapours. The apparatus comprises a first enclosure 30 consisting of a vertical tube, adapted to be heated with an electric heating resistor 31, automatic regulating means being provided for maintaining the enclosure at the predetermined temperature. Disposed in the enclosure is a screw conveyor 32 having a rotatably mounted axial shaft 33 arranged to be driven from a motor through a speed reducer and regulator unit 35. The oxide material to be reduced is fed into the enclosure through a conventional feeder device schematically indicated at 34—36 and comprising an air-lock as well as air bleeding means for maintaining in the enclosure a predetermined vacuum and for preventing the ingress of air during the feeding of oxide into the enclosure. The oxide powder is supported upon a grate or perforated bottom wall 53 engaged by scraper blades 54 supported from the lower end of the screw conveyor shaft for rotation therewith over the surface of the grate 53. The lower end of the enclosure communicates through a pipe 37 with a further enclosure 38 heatable with the resistor 39, means being provided for automatically adjusting the internal temperature of the enclosure 38 so as to heat the magnesium 40 contained in it to a temperature within a range extending from the boiling point to the melting point of the magnesium; the temperature provided in enclosure 38 may be different from that provided in enclosure 30, but should be lower than the latter. From a point of enclosure 31, preferably in a relatively hot section thereof, there extends a tube 41 leading to a filter 42 adapted to arrest powder and dust particles, followed by a condenser 43 connected by a line 44 with the intake side of a pump 45 having its discharge side 46 connected with a chamber 47 overlying the enclosure 38 and having means associated therewith, as indicated at 48, for feeding magnesium while preventing the ingress of air. The enclosures, filter 42, condenser and lines are filled with an atmosphere of protective (i.e. inert or reducing) gas, circulated by a pump 45 and serving at the same time as a carrier agent for the vapours. Thus, the gas will pick up magnesium vapour as it flows through enclosure 38 and will circulate the vapour through the oxide powder 49 to be reduced filling the enclosure 30 up to a level indicated at *a*. The vertical extent of the column of powder is so predetermined that under the prevailing operating conditions there will practically not remain any magnesium vapour in the zone 51 from which the carrier gas is withdrawn through outlet 41. Since this zone is comparatively hot, any remaining unreacted magnesium vapour will not tend to condense thereat. Such condensation will occur in the condenser 43 to which the magnesium powder does not have access since the powder was arrested by filter 42. The resulting metal is withdrawn from chamber 52 at the bottom of enclosure 30.

By performing the method of the invention, chromium powder has been obtained having a particle composition as represented by the curve of Fig. 4, which is a diagram plotting the numbers of particles in ordinates against particle diameter in abscissae. The curve shows that, under the operating conditions used which are close to the optimum conditions, a major part of the particles have diameters in a range of from 0.5 micron to 3 microns. The curve has a maximum at about 1 micron diameter. By adjusting the operating conditions it is possible to shift the maximum of the distribution curve over a range of from about 1 micron to about 8 microns.

What we claim is:

1. A method of making fine chromium powder comprising vaporizing magnesium in one zone and passing the resultant vapor over a powdered chromium compound in a second zone, the powdered chromium compound having a determinable particle size, and maintaining the particle size of the chromium powder thus produced substantially equal to said determinable particle size by temperature regulation, a smaller particle size being produced by lower temperatures and a larger particle size being produced by higher temperatures.

2. A method as claimed in claim 1 further comprising passing the vapor over the chromium compound in the presence of a protective gaseous atmosphere and further maintaining particle size by controlling the pressure of the atmosphere.

3. A method as claimed in claim 1 wherein the chromium compound is chromium oxide.

4. A method as claimed in claim 1 wherein the chromium compound is chromium fluoride.

5. A method as claimed in claim 1 wherein the magnesium is in the form of an ingot.

6. A method as claimed in claim 1 wherein the vapor is entrained by a gas for conveyance to the second zone.

References Cited in the file of this patent

UNITED STATES PATENTS

| | | |
|---|---|---|
| 1,602,542 | Marden | Oct. 12, 1946 |
| 1,728,941 | Marden | Sept. 24, 1929 |

FOREIGN PATENTS

| | | |
|---|---|---|
| 915,343 | France | July 22, 1946 |
| 612,616 | Great Britain | Nov. 16, 1948 |

OTHER REFERENCES

Powder Metallurgy, page 13. Edited by Wulff. Published in 1942 by the American Society for Metals, Cleveland, Ohio.